Oct. 31, 1933.  A. CHESSIN  1,933,493
GROUND SPEEDOMETER
Filed Aug. 6, 1920.  3 Sheets-Sheet 1
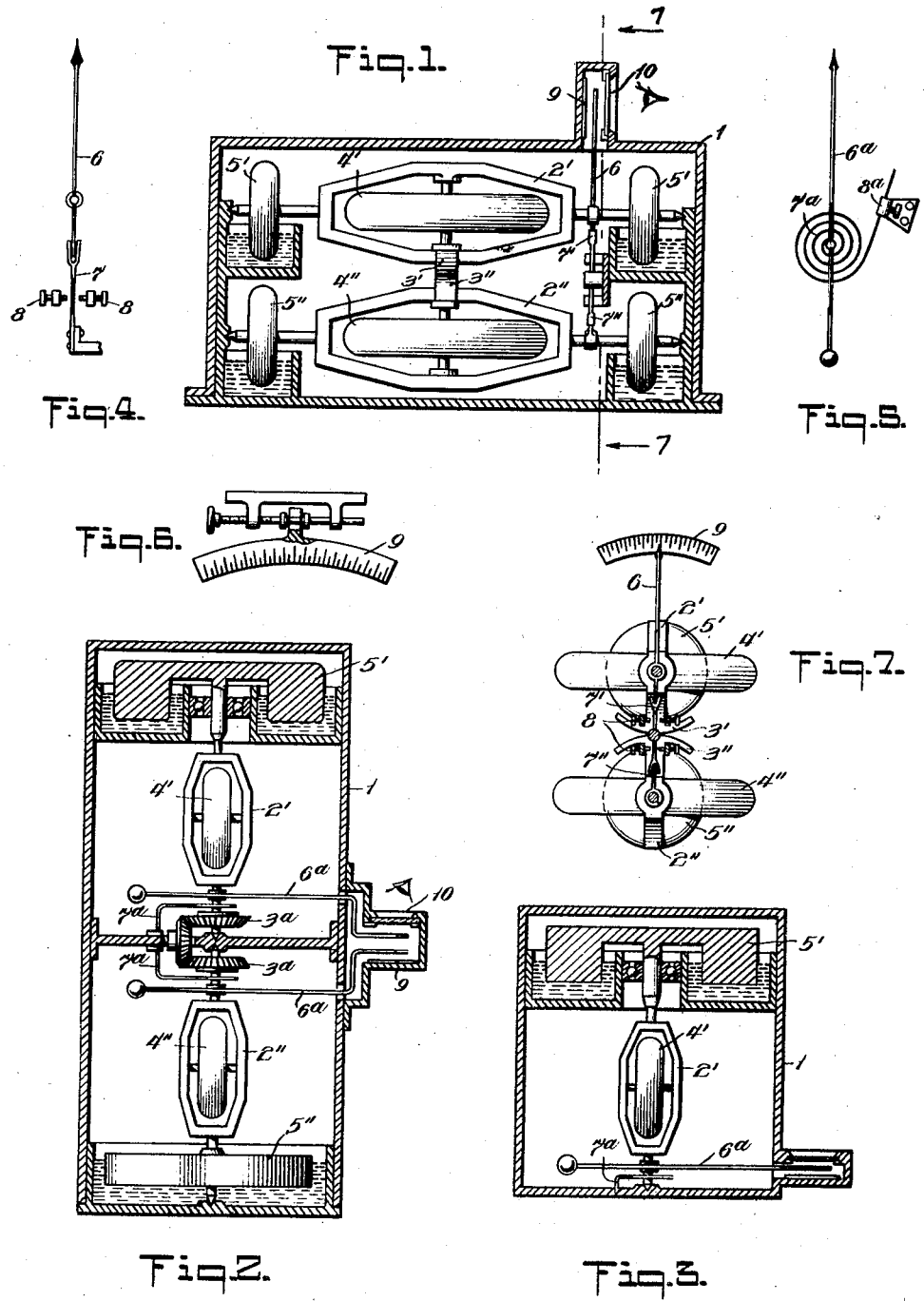
Inventor
Alexander Chessin Oct. 31, 1933.  A. CHESSIN  1,933,493
GROUND SPEEDOMETER
Filed Aug. 6, 1920  3 Sheets-Sheet 2

Inventor
Alexander Chessin

Oct. 31, 1933.                A. CHESSIN                    1,933,493
                         GROUND SPEEDOMETER
                         Filed Aug. 6, 1920              3 Sheets-Sheet 3

INVENTOR
Alexander Chessin

Patented Oct. 31, 1933

1,933,493

UNITED STATES PATENT OFFICE 1,933,493

GROUND SPEEDOMETER

Alexander Chessin, New York, N. Y.

Application August 6, 1920. Serial No. 401,810

24 Claims. (Cl. 33—204)

My invention relates to devices for determining the actual, or so called "ground" speed of a body moving over the surface of the earth.

The term "ground speed" is commonly used in connection with air craft, but is obviously applicable in general to bodies whose motion is affected by currents of the medium in which the body moves.

When, as in the present invention, gyroscopes are used in connection with moving bodies, it is necessary to distinguish between the absolute motion of a body, i. e. its motion relatively to our stellar system, and the motion of the body relatively to the earth, the absolute motion being the result of the combined motions of the earth itself and of the body relatively to the earth. At any moment, the absolute speed of a body is the resultant of two component velocities, one component being the velocity of the earth at the point of location of the body at that moment, and the other component being the velocity of the body relatively to the earth. The first component is called the "convective" speed of the body, and the second, or rather the horizontal component of second velocity, is the "ground" speed. Another term used in the following specification and claims is "convective motion", having reference to the motion of the body resulting from the convective speed alone.

My invention is believed to be the first of the kind that can be used successfully when flying amid clouds, in foggy or thick weather, or over large bodies of water, and, in general, when no direct points of reference on the earth are visible. It provides means for ascertaining the ground speed, the drift, and the true direction of flight, when applied to air craft. In marine navigation, it enables the navigator to ascertain the actual, net speed, the drift, and the true course of the vessel. Other novel and useful features of my invention will appear from the detailed description thereof.

Referring to the accompanying drawings:

Figure 1 is a front elevation of one form of my invention, wherein I employ two co-operating gyroscopes, the containing box therefor being drawn in cross section, to show the working device.

Figure 2 is a front elevation of a second form of my invention, differing from the first form mainly in the disposition of the gyroscopes, some portions of the apparatus being shown in cross section.

Figure 3 is a front elevation of still another form of my invention, wherein only one gyroscope is employed, portions of the apparatus being shown in cross section.

Figure 4 and Figure 5 are details of two forms of indicators used in my invention.

Figure 6 is another detail of my indicating device.

Figure 7 is a sectional view of the operating device in the first form of my invention, with the casing removed on line 7—7 Fig. 1, and, showing the coupling of the two gyroscopes and the indicating device.

Figure 15 is a schematic drawing of an indication multiplying device.

Figure 8:
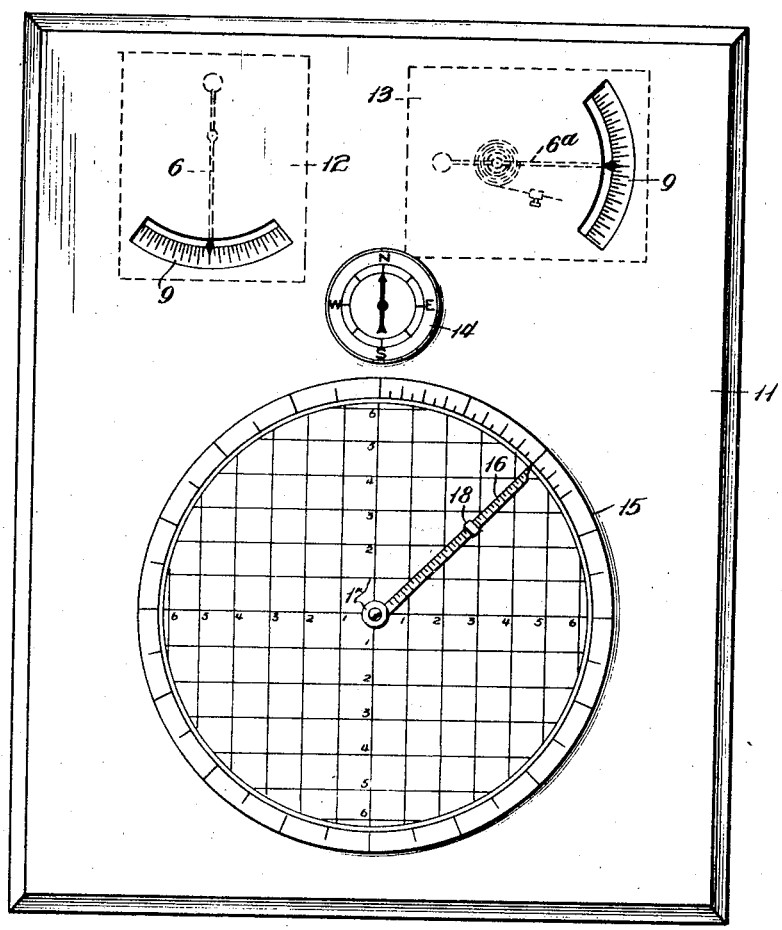
Figure 8 shows one arrangement of the complete apparatus, with two speed indicators at right angle to one another, a compass, and a chart for composing the velocities and indicating the true course of the moving body.

In the following description and claims, specific names are used for identifying parts, but they are intended to be as generic in their application to similar parts as the art permits.

Referring in particular to Figure 1, and the detail drawings in Figures 4 and 7, 1 is the casing which contains the operating device; 2' and 2" are frames pivoted in said casing; 3' and 3" are sectors attached to the corresponding frames, 2' and 2", and having frictional rolling surfaces, the rolling of one surface on the other forming the coupling of the two gyroscope frames and causing them to rotate in opposite direction; 4' and 4" are gyroscopes pivoted in said frames and spinning in opposite directions. 5' and 5" are floats carried by the axles of the said frames and immersed in a buoyant liquid contained in receptacles attached to the casing, for relieving the bearing frictions of the rotating frames 2' and 2"; 6 is an indicating needle attached to the axle of the frame 2', the rotation of this axle, together with the indicating needle, taking place against the tension of the spring member 7', while the co-operating spring member 7" acts in a similar manner with respect to the axle of the frame 2", the resistance of the said spring members being regulated by pressure of the adjusting screws 8; 9 is a scale mounted on the casing 1; and 10 is a glass covered opening in the casing for the purpose of observing the needle and scale. The scale is calibrated to speed units, as, for example, miles per hour.

Referring to Figure 2, this form of my invention differs from that shown in Figure 1 in that the gyroscopes spin about horizontal axes in lieu of vertical axes, and the frames 2' and 2" are rotatable about vertical, instead of horizontal, axes, the floats 5' and 5" being arranged to suit this new disposition of the gyroscopes, and the coupling of the frames 2' and 2", as shown, being in the form of bevel gears 3ª in place of the frictional sectors 3' and 3" of the first form. Two indicating needles 6ª are shown in this case, with corresponding spring members 7ª connecting the axles of the frames 2' and 2" with the casing, this type of indicating needle being shown in detail in Figure 5. The two indicating needles move in opposite directions with the corresponding gyro-axles, so that the angle between the indicating needles is twice the angle shown in the other types of my instrument. Thus, a more sensitive indication is obtained. It is a form of differential measure of angular deviation. The scale 9 and glass covered opening 10 in this case are horizontal.

Referring to Figure 3, the apparatus differs from that shown in Figure 2 by the omission of the gyroscope 4" and all parts connected therewith, including the coupling of the frames.

The detail drawing, Figure 6, shows means for causing a sliding movement of the scale 9 with respect to the casing of the instrument, this operation being well known and commonly used in astronomical instruments in connection with verniers.

Referring to Figure 8, on the board, or table, 11, are mounted two instruments, 12 and 13, of either one of the forms shown in Figures 2 and 3. The table 11 is maintained in such position that the longitudinal axis of the table points in the north-south direction, while the transversal axis of the table points east and west, a compass 14 being mounted on the table 11 in this connection. As shown, the reading of instrument 12 will give the speed northward or southward, while instrument 13 will record the speed eastward and westward. The latter reading must be corrected to take into account the rotation of the earth, and this may be done either by adjusting the tension of the indicator spring, or by moving the zero point of the scale 9. The simplest way of making this adjustment is to observe the deviation of the needle when the craft is stationary on the earth. The deviation in this case is due only to convective speed. Therefore, to eliminate the effect of the earth's rotation on the indication of the needle, one only has to change the tension of the spring until the needle comes to the zero mark on the scale, or the zero mark is made to coincide with the deflected position of the needle by moving the scale. The indicating needle shown in instrument 12 is of the type illustrated in Figure 4; that shown in instrument 13 is of the type illustrated in Figure 5. It is not necessary to make different types of indicating needles for the two instruments, provided the one on instrument 13 is supplied with an adjustment, as hereinbefore mentioned. Two types are shown merely to indicate that either form of needle may be used. As shown, the tension of spring 7ª of the type illustrated in Figure 5 is regulated by means of a sleeve through which the spring is drawn, and an adjusting screw 8ª. If the adjustment is made by moving the scale 9 in the instrument 13, this is done in the manner illustrated in the Figure 6. On the table 11 is mounted a scale, or chart, 15, and a rule 16 with sliding member 18, the rule 16 being rotatable about the center 17 of the chart 15. The longitudinal scale of the chart 15 is in terms of speed in the north and south direction; the transversal scale of chart 15 is in terms of speed in the east and west direction; and the circumferential scale is in standard degrees of a circle. The scale on rule 16 is in terms of ground speed.

Figure 9:
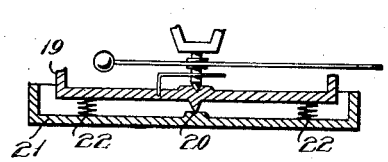
Figures 9 and 10 are details showing various forms of resilient mounting of the gyroscopes.

Referring to Figure 9, 19 is a portion of the casing 1 of Figure 3, this casing being allowed a slight swinging motion on the knife edge 20 about the base 21, by means of the springs 22.

Figure 10:
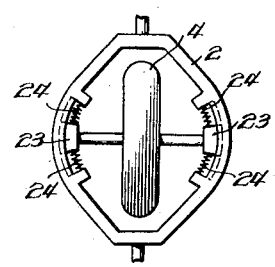

Referring to Figure 10, the gyroscope 4 and its frame 2 are as in Figure 2 or 3, except that the gyroscope is allowed a slight freedom of oscillation in the plane of the frame, by means of the sliding bearings 23 and springs 24.

The modifications of my device illustrated in Figures 9 and 10 may be introduced in any one of the types of instrument illustrated in Figures 1, 2, 3 or 11, with proper selection of one, or the other, forms of resilient members shown in Figures 9 and 10. For instance, the form shown in Figure 9 would be better fitted for use in connection with the type illustrated in Figure 3, while the form shown in Figure 10 would be better adapted for the types illustrated in Figures 1, 2 and 11.

Figure 11:
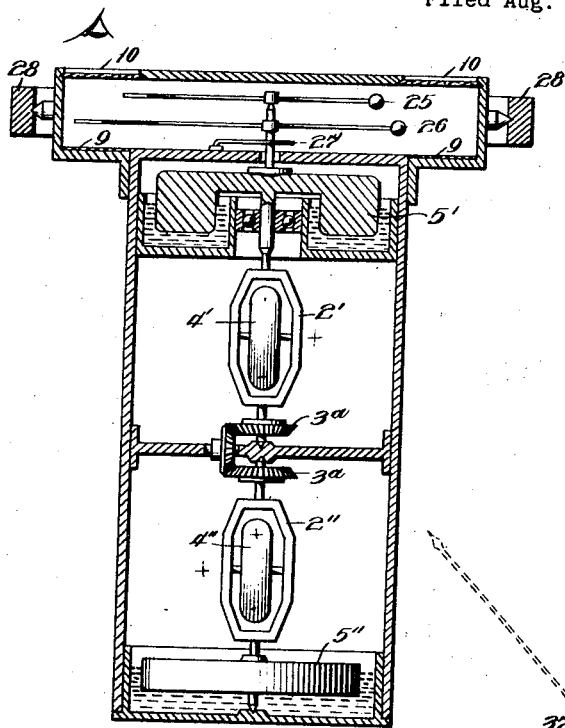
Figure 11 is a front elevation of the preferred form of my invention, some portions being shown in cross section for the sake of clearness. In my preferred form, two co-operating gyroscopes are employed in conjunction with a magnetic needle.

Referring to Figure 11, this form of my invention differs from that shown in Figure 2 mainly in the addition of the magnetic needle 25. The two indicator needles 6ª of Figure 2 are replaced by the single indicator needle 26 and corresponding spring member 27, and the indicating scale 9 is extended to make a complete circle. The glass covered opening 10 in the casing is extended to conform with the scale extension. The apparatus, as shown, is arranged to swing in gimbals of which, however, only one ring, 28, is shown, namely, the one in which the instrument is carried. This gimbal ring 28 is pivoted in a second gimbal ring (not shown) about an axis perpendicular to the axis about which the instrument is suspended in the gimbal ring 28.

Figure 12:
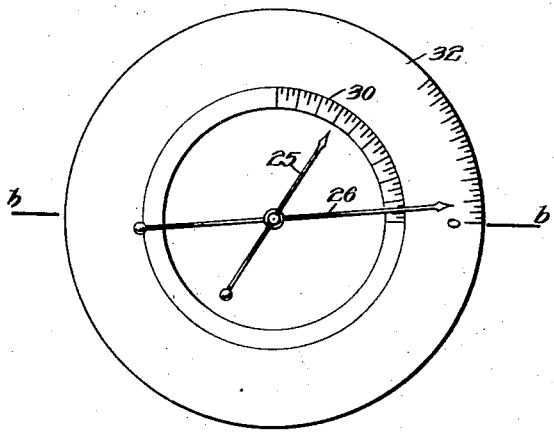
Figures 12 and 13 are indicating devices used in connection with my preferred form, one of these being for the determination of the component of the ground speed in the direction of the lubber's line, and the other for determination of the drift at right angles to the lubber's line.
Figure 13:
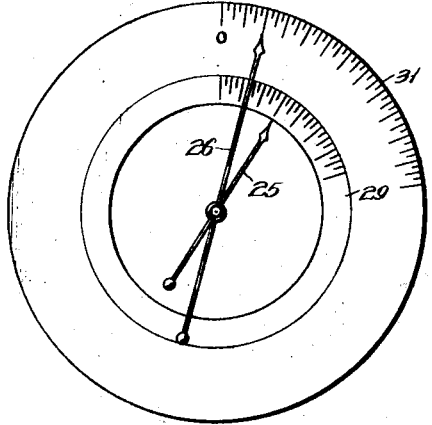

The indicating devices used in my preferred form are shown in Figures 12 and 13, a complete apparatus comprising two instruments, one wherein the zero mark of the indicating needle points in the direction of the lubber's line, and the other wherein the zero mark of the indicating needle points in the direction perpendicular to the lubber's line. The two instruments may be suspended from the same, or from separate sets of gimbals, or they may be placed on the same, or separately stabilized table, any one of the methods known in the art for stabilizing a plane being adapted for the purpose. The indicating devices for the two instruments are shown separately in Figures 12 and 13. Each indicating device comprises a convective speed scale and an absolute speed scale, the first co-operating with the magnetic needle, and the second with the gyroscope indicating needle. The convective scale 30 of Figure 12 is proportional to the cosine of the "bearing" angle, i. e. the angle between the magnetic needle and the lubber's line, while the convective scale 29 of Figure 13 is proportional to the sine of the same angle. The absolute scales 31 and 32 of the two instruments are proportional to the torques of their respective gyroscopes and give the absolute speed of the body in the direction of the lubber's line and at right angles thereto, respectively. The speeds relatively to the earth in either direction are determined by the difference between the figures indicated on the two scales of each instrument. The lubber's line is indicated by the line $a$—$a$, and the line perpendicular thereto, or the "drift" line, by $b$—$b$.

Figure 14:
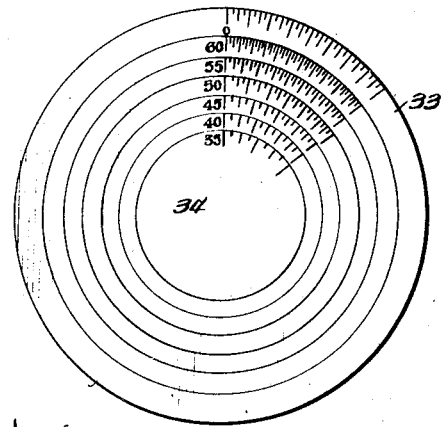
Figure 14 is a detail of another form of my indicating device wherein are shown different scales corresponding to variation of latitude.
Figure 18:
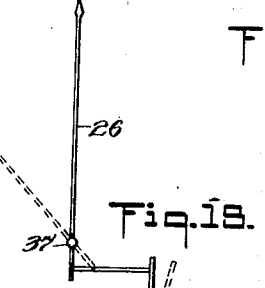

Referring to Figure 14, the convective scale 34, co-operating with the absolute scale 33, is drawn to various latitudes and may be substituted for the convective scales 29 and 30 of Figures 12 and 13.

Finally, Figure 15 shows how the angular deviations of the gyroscopic frames 2' and 2", which rotate about the point 36, are restricted by the tension of the springs 35, while the indication of this angular deviation is multiplied on the indicating needle 26, rotating about the point 37, through the leverage arrangement, so that the indications are clear without the gyroscopes being appreciably deflected.

The operation of the device will now be explained. Although the device is applicable to marine navigation, as well as to navigation in air, the operation will be explained as applied to air crafts, because it covers the subject more completely and navigation in air presents more varied problems.

When an aircraft moves from a position A to a position B, the axis of spin of a gyroscope, mounted on the aircraft so as to preserve a horizontal direction, is compelled to change its direction in the stellar space by an angle $\alpha$ which equals the angle subtended by the arc of a circle between A and B, the center of this circle being at the center of the earth. The absolute speed of the air craft, i. e. the speed relative to the stellar space, is the product of $$\frac{d\alpha}{dt}$$

by the distance of the craft from the center of the earth. This distance may be taken as constant and equal to the radius of the earth, owing to the enormous length of this radius as compared with the variations in the height of the air craft from the earth's surface. Therefore, the absolute speed of the craft is measured by $$\frac{d\alpha}{dt},$$

i. e. by the rate of change of the angle $\alpha$. On the other hand, the gyroscopic torque, due to the fact that the gyroscope is compelled to remain horizontal during the change of position of the air craft, is also proportional to the rate of change of the angle $\alpha$, i. e. to $$\frac{d\alpha}{dt},$$

so that the gyroscopic torque is a measure of the absolute speed of the air craft.

The purpose of the resilient mounting shown in Figures 9 and 10 is to give more stability to the gyroscope by adding a limited degree of freedom of rotation about a third axis.

From this principle the operation of my device becomes easily apparent. All that is needed to determine the speed of the craft relative to the earth, is to provide a scale on which the amount of the gyroscopic torque is indicated at any moment, this amount being a measure of the absolute speed of the craft, and a second scale, on which is indicated the convective speed of the craft at the same amount, i. e. the speed with which the craft participates in the rotation of the earth. The difference between the absolute and the convective speeds is the speed relative to the earth, or "ground" speed.

The device may be operated in two ways. One method is to set up one instrument with its gyroscope indicator needle pointed in the north-south direction, and the other instrument with its gyroscope indicator needle pointed in the east and west direction. This method is illustrated in Figure 8. It requires for its operation that some means be available for keeping the table 11 in a position such that one edge thereof (or its longitudinal axis) is parallel to the north-south direction. This might be accomplished by hand, or by some rotating mechanism in synchronism with the indications of a compass. The advantage of this method lies in the fact that one of the two instruments, namely instrument 12, is not affected by the convective motion, while the other, 13, may be corrected for the convective motion as before explained, so that both instruments give a direct measure of the speed relative to the earth, or "ground" speed, in the north-south and in the east-west directions, respectively. These two velocities are then composed on the table 11, as shown, by means of the rule 16, slide 18, and various scales of the chart 15. The disadvantage of this method lies in the necessity of rotating the table 11 to correspond with the change in the bearing angle of the craft.

The other method, which I prefer, is the one utilizing the apparatus illustrated in Figures 11, 12, 13 and 14. In this method, also, two instruments are required to obtain the ground speed in the actual direction of flight, but the two instruments are differently disposed. One is set up with the zero mark of its gyroscope indicator needle pointed in the fore and aft direction of the craft, and the other athwart, at right angles to the first. The composition of the two speeds thus indicated would be made in a manner similar to that of the previously discussed method and, for that reason, is not again shown in the drawings. Only the two instruments used in this method are shown, namely, my preferred form, as illustrated in Figures 11, 12, 13 and 14. But it should be noted that an aviator is much more concerned in knowing the speed of the craft relative to the earth in the fore and aft direction and the speed of drifting at right angles thereto, than in the composition of these two speeds, so that, for all practical purposes, it is not necessary to combine the two instruments for composition of velocities on a table, as in the first method.

The operation of my device, in accordance with the preferred method, is as follows:

As the air craft flies over the earth, the direction of gravity changes and a torque is developed by the gyroscopes, with the result that the needle 26 is deflected against the action of the spring 27 from its normal position. The rotation of the earth, however, contributes to this deflection and, in general, a measure of the speed of the air craft relative to the earth is not given by the deflection without correction. When flying in the north-south direction, the axes of the gyroscopes being in the lubber's line, the gyroscopes are not affected by the rotation of the earth. In all other directions, the earth's rotation will contribute to the deflection and the effect is proportional to the sine of the "bearing" angle, that is the angle between the lubber's line and the north-south direction. The magnetic needle 25 gives the bearing angle and, by graduating the scale 29 proportionally to the sines of the bearing angles, a direct reading is obtained which is proportional to the amount of the correction which must be applied to the reading of the needle 26 on the scale 31 to obtain the actual speed of the craft in the fore and aft direction, relative to the earth. The actual correction also depends, as is obvious, on the latitude in which the air craft is, but by making use of the dial illustrated in Figure 14 the correction for the particular latitude may be read on the dial. The instrument 12 is fixed in a position at right angles to the instrument 13. In this case, the convective speed depends on the cosine of the bearing angle, and the scale 30 is graduated accordingly.

It will be readily understood that by merely adding or subtracting observations from scales 29 and 31, the component in the lubber's line of the speed of the craft relative to the earth is given by the instrument shown in Figures 11, 13, and, similarly, the instrument shown in Figures 11, 12, gives the drift, or component of speed at right angles to the lubber's line. If desired, these two components may be composed to give the direction and magnitude of the speed relative to the earth in the direction of actual flight. There are several methods known in the art for mechanically combining velocities and such a mechanism may be used in my device so as to give a direct reading of the ground speed in the direction of actual flight. But, as already remarked, an aviator is more concerned with the ground speed components along the fore and aft direction, and along the drift line, than with the resultant of these two speeds.

It was explained, when describing the apparatus shown in Fig. 8, how the convective speed may be taken account of either through adjustment of the tension of spring 7, or by moving the scale 9, in that particular form of the device, thus obtaining direct readings of ground speed components. It should be noted that with the help of the same adjusting means, variations of latitude may be taken care of, instead of using the dial shown in Figure 14.

It remains to consider what happens to my device when the air craft describes a curve. On sea, of course, only horizontal curves have to be considered. It is different with air craft which may fly in a curved path having a vertical plane, as when making a loop, or a curve of double curvature, like a spiral. Let us, first, consider the case of a horizontal curve. In this case, the device shown in Figures 11, 13, whose gyro axes are normally directed in the fore and aft direction, horizontally, will not be affected by the centrifugal forces, on account of the double gyroscope construction and their coupling for opposite precession. But the other instrument, shown in Figures 11, 12, with the gyroscopes directed athwartship, will be violently affected by these forces, the disturbing torque causing precession about the vertical with corresponding deviation of the gyro indicator needle. The drift indicating apparatus, thus, will cease to operate, recording, instead, the rate of inclination of the craft, or the so called "banking". These inclination measuring deviations are so different in character from the normal drift indications, that the two will never be confused. The jump from one to the other, owing to the suddenness of the change and its magnitude, will at once be apparent on the scale, especially as the scale of the other instrument remains unaffected thereby. Likewise, when the air craft describes a vertical curve, such as a loop, similar effects are observed, except that the roles of the two instruments are now reversed. The drift recording instrument will not be affected by the centrifugal forces, while the instrument which records the speed in the direction of the lubber's line will be violently affected, cease to record speed, and will indicate, instead, the rate of turning on the vertical curve. Thus, it will be seen that under such circumstances the indications of one, or t e other, instrument may be taken as a measure of the centrifugal forces acting on the moving craft and, likewise, as a measure of the rate of inclination of the craft under the action of such forces. This rate of inclination may be indicated by providing special graduations, in addition to those recording speed, on the scales of the two instruments. When the craft moves in a spiral, both instruments will record violent deviations. Thus it will be seen that even should there be no special graduation provided on the scales, as above mentioned, for recording the various gyrations of the craft, the mere fact that one, or the other, or both of the instruments record sudden and violent deviations would indicate, respectively, that the craft is describing a horizontal, a vertical, or a spiral curve.

It will be seen that the present invention is designed to indicate ground speed when the craft moves on a straight course and it gives a correct measure of this speed so long as the course of the craft remains unchanged. Thus, an air pocket has no effect on the indications of the instrument because it introduces no centrifugal forces, nor is the instrument affected by oscillations of the craft such as rolling, pitching or yawing, owing to its mounting in gimbals or on a stabilized plane, and the floats provided for one of the set of axles, wherein the present device differs from instruments designed to indicate or measure such oscillations, the latter instruments being so designed as to participate in that particular oscillation which the device is intended to indicate or measure. But when the craft is traveling along a curved path, as has been already pointed out, the instrument becomes subject to the action of centrifugal forces and ceases to act as a ground speed indicator, becoming, instead, an inclinometer.

While I have shown and described, and have pointed out in the annexed claims, certain novel features of my invention, it will be understood that various omissions, substitutions and changes in the form and details of the device as illustrated and its operation may be made by those skilled in the art, without departing from the spirit of the invention.

Having fully described my invention, I claim:

1. In a moving body, a gyroscope adapted to develop a torque as the body moves, means for indicating the convective speed of said body, and means, responsive to said torque and co-operating with said first mentioned means, for determining the horizontal component of the speed of said body relatively to the earth.

2. In a moving body, a pair of co-operating gyroscopes spinning in opposite direction and coupled for opposite rotation about axes perpendicular to the axes of spin, adapted to develop torques as the body moves, means for indicating the convective speed of said body, and means, responsive to said torques and co-operating with said first mentioned means, for determining the horizontal component of the speed of the body relatively to the earth.

3. In a moving body, a gyroscope adapted to develop a torque as the body moves, a speed indicating device responsive to said torque, and means for adjusting said speed indicating device to compensate for the rotation of the earth.

4. In a moving body, a gyroscope adapted to develop a torque in response to changes in direction of gravity as the body moves, means for measuring said torque, and means for regulating said first mentioned means to compensate for the rotation of the earth.

5. In a moving body, a pair of co-operating gyroscopes spinning in opposite direction and coupled for opposite rotation about axes perpendicular to the axes of spin, means, co-operating with said gyroscopes, for indicating the speed of said body, and means for adjusting said indicating means to compensate for the rotation of the earth.

6. An apparatus, including a gyroscope spinning about one of its axes, rotatable about a second axis, and its axis of spin being resiliently mounted for limited rotation only about a third axis, means adapted to oppose the rotation of the gyroscope about said second axis and to restore the axis of spin of the gyroscope to its normal position.

7. An apparatus, including a pair of gyroscopes spinning in opposite direction, each gyroscope spinning in a frame which is mounted for free rotation about an axis perpendicular to the axis of spin of the gyroscope, the two frames being coupled for opposite rotation, and each gyroscope being mounted in said frame for limited freedom of rotation about a third axis, means for measuring gyroscopic torques about said axes perpendicular to the axes of spin, which means are adapted to oppose the rotation of said frames and to restore the axes of spin of the gyroscopes to their normal positions.

8. In a moving body, an apparatus consisting of two units, each unit comprising a pair of co-operating gyroscopes adapted to spin in opposite directions about axes which have a common predetermined direction when the body is stationary, each gyroscope being rotatable about an axis other than the axis of spin, said other axes being parallel to a second predetermined direction, one of the predetermined directions specified for each unit being common to them both, means co-operating with each one of said pairs of gyroscopes for determining the ground speed of the body in the predetermined direction specified for each unit and not common to them both and means for combining such directional ground speed determinations for determining the actual ground speed of the body.

9. A speed measuring gyroscope in a moving body in combination with a convective speed indicator.

10. In a moving body, a gyroscope, means co-operating with said gyroscope for determining the ground speed of said body in the fore and aft direction, and an indicating device connected therewith and comprising a scale graduated to show the convective speed in said fore and aft direction.

11. In a moving body, a gyroscope, means co-operating with said gyroscope for determining the drift of said body at a right angle to the fore and aft line, and an indicating device connected therewith and comprising a scale graduated to show the convective speed in said direction at a right angle to the fore and aft line.

12. In a moving body, a gyroscope adapted to develop a torque during transportation from place to place, mounting means for said gyroscope, including means for maintaining its position regardless of oscillations of said body, and means, responsive to said torque, for indicating the speed of the said transportation.

13. In a moving body, a gyroscope adapted to develop a torque as the body moves, mounting means for said gyroscope, including means for maintaining its position regardless of oscillations of said body, and means, responsive to said torque, for indicating the speed of said body when the body is moving in a straight path, which means act as an inclinometer when the body moves in a curved path.

14. In a ground speed indicator for a moving body, an apparatus comprising a pair of co-operating gyroscopes spinning in opposite direction, each gyroscope spinning in a frame which is mounted for free rotation about an axis perpendicular to the axis of spin of the gyroscope, the two frames being coupled for opposite rotation, said gyroscopes being adapted to develop torques as the body moves, means for exerting counter torques balancing said gyroscopic torques and adapted to hold the axes of spin of the gyroscopes within close limits to a predetermined direction, a speed indicating meter responsive to said balanced torques, and means for correcting the indications of said meter to compensate for the convective speed at any latitude.

15. In a ground speed indicator for a moving body, a pair of cooperating gyroscopes adapted to develop a torque in response to changes in the direction of gravity as the body moves, said gyroscopes spinnning in opposite direction and being coupled for opposite rotation about axes perpendicular to the axes of spin, means for exerting a counter-torque to said gyroscopic torque, means for indicating the ground speed of said moving body when said gyroscopic torque and said counter-torque balance one another, and means for adjusting said counter-torque for changes in the convective speed of said body due to variations in latitude.

16. In a ground speed indicator for a moving body, means for indicating the angle of a predetermined line with the north-south direction, and a scale graduated in terms of a trigonometric function of said angle, to show the convective speed of the body in the direction of said predetermined line for a given latitude, said indicating means moving over said scale.

17. In a ground speed indicator for a moving body, means for indicating the angle of a predetermined line with the north-south direction, and a multiple dial graduated in terms of a trigonometric function of said angle, to show convective speed of the body in the direction of said predetermined line at various latitudes, said indicating means moving over said dial.

18. In a ground speed indicator for a moving body, a gyroscope adapted to develop a torque as the body moves, mounting means for said gyroscope including means for maintaining its position regardless of the oscillations of said body, and means responsive to said torque for indicating the horizontal component of that speed which is the resultant of the convective and the ground speeds of the body.

19. In a ground speed indicator for a moving body, a pair of co-operating gyroscopes spinning in opposite directions and coupled for opposite rotation about axes perpendicular to the axes of spin, said gyroscopes being adapted to develop torques about said axes perpendicular to the axes of spin as the body moves, mounting means for said gyroscopes including means for maintaining their positions regardless of the oscillations of said body, and means, responsive to said torques, for indicating the horizontal component of that speed which is the resultant of the convective and the ground speeds of the body.

20. In a ground speed indicator for a moving body, a plurality of gyroscopes adapted to develop torques in response to changes in the direction of gravity as the body moves, mounting means for said gyroscopes including means for maintaining their positions regardless of the oscillations of said body, and means for measuring said torques.

21. In a ground speed indicator for a moving body, a frame, means for maintaining said frame in a plumb position regardless of oscillations of said body, a pair of co-operative gyroscopes mounted in said frame to spin in opposite directions about axes which have a common predetermined direction when the body is stationary, each gyroscope being rotatable about an axis other than its axis of spin, said other axes being parallel to a second predetermined direction, and means responsive to the torque developed by said gyroscopes as the body moves, for determining the ground speed of the body in one of said predetermined directions.

22. In a ground speed indicator for a moving body, a gyroscope adapted to develop a torque in response to changes in direction of gravity as the body moves, mounting means for said gyroscope including means for maintaining its position regardless of oscillations of said body, means for exerting a counter-torque to said gyroscopic torque, and means for regulating said counter-torque.

23. In a ground speed indicator for a moving body, a pair of co-operating gyroscopes adapted to develop torques in response to changes in direction of gravity as the body moves, mounting means for said gyroscopes including means for maintaining their positions regardless of oscillations of the body, means for exerting counter-torques to said gyroscopic torques and adapted to hold the axes of spin of the gyroscopes in balanced positions at a small angle with a predetermined direction, and an indicating device comprising means for multiplying said angle.

24. In a ground speed indicator for a moving body, a gyroscope adapted to develop a torque in response to changes in direction of gravity as the body moves, mounting means for said gyroscope including means for maintaining its position regardless of oscillations of said body, means for exerting a counter-torque balancing said gyroscopic torque and adapted to hold the axis of spin of the gyroscope within close limits to a predetermined direction, a meter responsive to said balanced torque, and means for multiplying the indications of said meter.

ALEXANDER CHESSIN.